(12) United States Patent
Pucnik et al.

(10) Patent No.: US 9,188,419 B2
(45) Date of Patent: Nov. 17, 2015

(54) METHOD AND DEVICE FOR CALIBRATING A REFERENCE SYSTEM FOR VEHICLE MEASUREMENT

(75) Inventors: Darko Pucnik, Unterfoehring (DE); Christian Wagmann, Munich (DE); Jochen Backes, Munich (DE); Sven Hodissen, Munich (DE); Volker Uffenkamp, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 245 days.

(21) Appl. No.: 13/822,545

(22) PCT Filed: Jul. 20, 2011

(86) PCT No.: PCT/EP2011/062464
§ 371 (c)(1),
(2), (4) Date: Jun. 4, 2013

(87) PCT Pub. No.: WO2012/034745
PCT Pub. Date: Mar. 22, 2012

(65) Prior Publication Data
US 2013/0239421 A1    Sep. 19, 2013

(30) Foreign Application Priority Data

Sep. 13, 2010 (DE) .......................... 10 2010 040 655

(51) Int. Cl.
*G01C 9/02* (2006.01)
*G01B 5/14* (2006.01)
*G01B 11/275* (2006.01)

(52) U.S. Cl.
CPC ............... *G01B 5/14* (2013.01); *G01B 11/275* (2013.01); *G01B 2210/12* (2013.01)

(58) Field of Classification Search
CPC .... G01B 5/14; G01B 11/275; G01B 11/2755; G01B 2210/12
USPC ...................................... 33/203, 288, 301, 600
See application file for complete search history.

(56) References Cited

U.S. PATENT DOCUMENTS

| 4,534,200 A * | 8/1985 | Celette .......................... 33/600 |
| 5,425,523 A | 6/1995 | Madey et al. |

(Continued)

FOREIGN PATENT DOCUMENTS

| CN | 1443298 | 9/2003 |
| CN | 1533496 | 9/2004 |

(Continued)

OTHER PUBLICATIONS

International Search Report, International Application No. PCT/EP2011/062464, dated Jan. 12, 2012.

*Primary Examiner* — G Bradley Bennett
(74) *Attorney, Agent, or Firm* — Kenyon & Kenyon LLP (57) ABSTRACT

A calibration frame for calibrating a reference system for vehicle measurement has setting elements, which enable a precise spatial orientation of the calibration frame, and multiple defined points of support, which are designed to accommodate a reference system carrier. In one specific embodiment, the points of support are designed in such a way that the reference system carrier is situatable on the points of support in at least two different orientations. In a second specific embodiment, a leveling element is provided which indicates the spatial orientation of the calibration frame in relation to the earth's gravitation field.

19 Claims, 6 Drawing Sheets

(56) References Cited

U.S. PATENT DOCUMENTS

| | | | |
|---|---|---|---|
| 6,209,209 B1 * | 4/2001 | Linson et al. | 33/203.12 |
| 2002/0080343 A1 | 6/2002 | Bux et al. | |
| 2011/0221867 A1 * | 9/2011 | Nobis et al. | 348/46 |
| 2011/0265337 A1 * | 11/2011 | Nobis et al. | 33/288 |
| 2014/0002638 A1 * | 1/2014 | Cerruti et al. | 348/135 |
| 2014/0360032 A1 * | 12/2014 | Henblad et al. | 33/301 |

FOREIGN PATENT DOCUMENTS

| | | |
|---|---|---|
| CN | 101809404 | 8/2010 |
| EP | 0 263 089 | 4/1988 |
| WO | WO 2010/028946 | 3/2010 |

* cited by examiner

METHOD AND DEVICE FOR CALIBRATING A REFERENCE SYSTEM FOR VEHICLE MEASUREMENT

FIELD

The present invention relates to a method and a device for calibrating a reference system such as the one used in vehicle measurement.

BACKGROUND INFORMATION

For a vehicle standing on a measuring station, a vehicle measuring device which has two measuring units, each of the two measuring units having a reference system, is described in PCT Application No. WO 2010/028946 A1. This vehicle measuring device is designed to determine the horizontal and the vertical positions of each of the two measuring units and the relative position of the measuring units to one another.

To obtain accurate results for the vehicle measurement, reference systems are to be calibrated before the measurements are carried out.

SUMMARY

It is an object of the present invention to provide a device and a method for calibrating such a reference system.

A calibration frame according to the present invention for calibrating a reference system for vehicle measurement has a number of setting elements which enable a precise spatial orientation of the calibration frame and a number of defined points of support which are designed to accommodate a reference system carrier in such a way that the reference system carrier is situatable on the points of support in at least two different orientations.

A method according to the present invention for calibrating a reference system having at least one tilt sensor includes the steps of situating the reference system in a first position on the calibration frame; measuring the values of the reference system in the first position; situating the reference system in a second position on the calibration frame, which is different from the first position, without changing the position of the calibration frame; measuring the values of the reference system in the second position; and averaging the values measured in the first and in the second positions.

By averaging the values of the reference system measured in the two positions, the deviations from the exact orientation in the two positions cancel each other out. The method enables an exact calibration of the tilt sensor of the reference system without much effort and without highly accurate measuring and adjusting devices being necessary to exactly orient the reference system toward the earth's gravitation field.

In one alternative specific embodiment, at least one leveling element is situated on the calibration frame in such a way that the calibration frame is orientable in at least one direction in relation to the earth's gravitation field with the aid of the leveling element by adjusting the setting elements. Using such a leveling element, the calibration frame is orientable with high accuracy relative to the earth's gravitation field. If the calibration frame is oriented accurately toward the earth's gravitation field, the second measuring step and the averaging of the measured values may be omitted. It is therefore not necessary for the reference system to be situatable in a second position on the calibration frame.

In one specific embodiment, the leveling element is a vial (water level) or an electronic tilt sensor. A vial provides a particularly cost-effective and easy to use leveling element. An electronic tilt sensor enables a particularly accurate leveling of the calibration frame. The calibration frame may be leveled automatically, if necessary, due to the cooperation of an electronic tilt sensor and motor-operated setting elements.

In one specific embodiment, a calibration tool is situated in a known position in relation to the calibration frame. Due to a calibration tool being situated in a known position, the reference system may be calibrated easily and with high accuracy.

In one specific embodiment, the calibration frame has a calibration tool which is situatable in two symmetric positions in relation to the calibration frame. With the aid of a calibration tool which is situatable in two symmetric positions in relation to the calibration frame, the reference system may be calibrated with high accuracy even if the exact position of the calibration tool is not known.

In one specific embodiment, a method according to the present invention includes situating the reference system in at least one other position on the calibration frame, without changing the position of the calibration frame; measuring the values of the reference system in the other positions; and computing the values measured in all positions. By computing the values of the reference system measured in multiple positions, it is possible to increase the accuracy of the calibration.

The present invention is explained below with reference to the figures.

DETAILED DESCRIPTION OF EXAMPLE EMBODIMENTS

Figure 1:
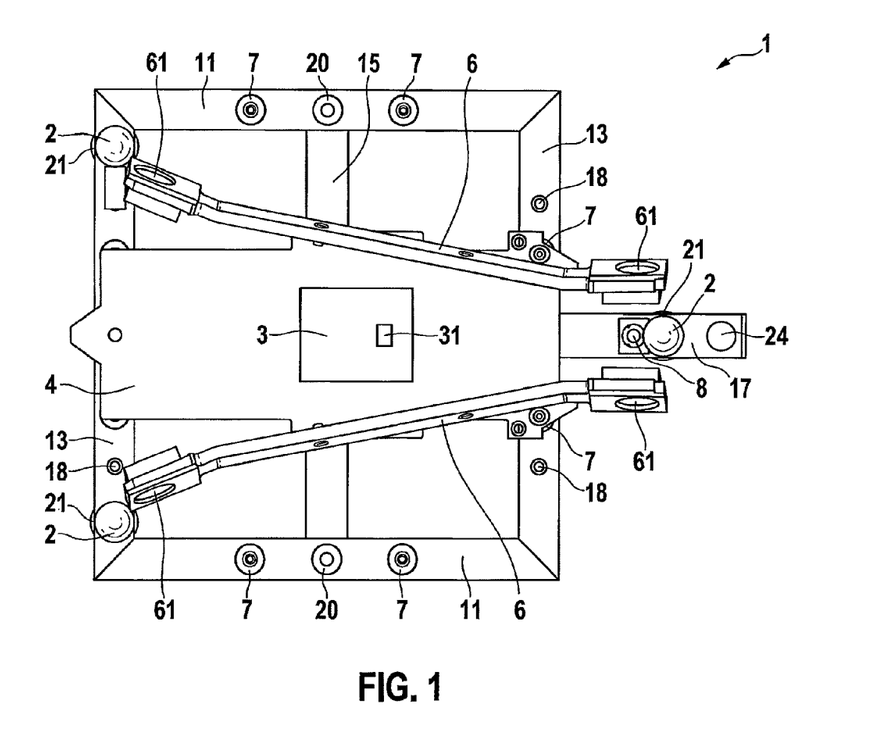
FIG. 1 shows a schematic top view of a calibration frame 1 according to an example embodiment of the present invention having a reference system carrier in a first orientation.

FIG. 1 shows a schematic top view of a calibration frame 1 according to the present invention on which a reference system carrier 4 having a reference system 3 is positioned.

In the exemplary embodiment shown in FIG. 1, calibration frame 1 is generally a square having two first beams 11 running in parallel to one another and two second beams 13 running at right angles to first beams 11. A third beam 15 is situated in the center between the two first beams 11 and in parallel to the two second beams 13.

On one side of the square formed by first and second beams 11, 13, a fourth beam 17 is mounted which extends at a right angle in parallel to first beams 11 to the outside from the center of one of second beams 13.

On fourth beam 17 and on that of second beams 13 on which fourth beam 17 is not mounted, feet 21 having associated setting elements 2 are mounted. The vertical distance between feet 21 and respective beams 13, 17 is variable by operating, e.g., rotating, setting elements 2. Setting elements 2 make it possible in conjunction with associated feet 21 to precisely spatially orient the plane spanned by beams 11, 13, 15 of calibration frame 1.

Feet 21 may be magnetic or may be designed to have suction cups to be able to securely but detachably fasten calibration frame 1 on a measuring device. On fourth beam 17, an ejector 24 is additionally provided which makes it possible to tilt calibration frame 1 to detach feet 21 from the measuring device. Ejector 24 is mounted at a greater distance from second beam 13 than from foot 21 so that a leverage of calibration frame 1 may be utilized when feet 21 are detached due to the operation of ejector 24.

On the top side of beams 11, 13 of calibration frame 1, which faces the observer, multiple points of support 7 are implemented which are designed to accommodate fitting points of a reference carrier plate 4.

In the exemplary embodiment shown in FIG. 1, reference carrier plate 4 having a reference system 3 is situated on points of support 7 of calibration frame 1 in such a way that generally rectangular reference carrier plate 4 extends longitudinally in parallel to first carriers 11 of calibration frame 1. In addition to a reference system 3, which includes at least one tilt sensor 31, two camera carriers 6, each having two cameras 61 directed to the outside, are situated on reference carrier plate 4. For this purpose, camera carriers 6 are situated in such a way that cameras 61 shown on the left-hand side of FIG. 1 are spaced farther apart from one another than on the side of reference system carrier 4 shown on the right in FIG. 1, i.e., camera carriers 6 run toward one another from left to right in a V-shaped manner.

On fourth beam 17, a leveling element 8, which is designed to determine the spatial orientation of the plane spanned by calibration frame 1, is situated between setting element 2 and second beam 13, to which fourth beam 17 is connected. Leveling element 8 may be designed as a vial (water level) or as an electronic tilt sensor, for example.

With the aid of leveling element 8, the spatial orientation of calibration frame 1 is exactly determinable. By operating setting elements 2, while simultaneously monitoring the display or output of leveling element 8, it is thus possible to very accurately set the spatial orientation of calibration frame 1. In particular, calibration frame 1 may be set in such a way that the plane spanned by first, second, and third beams 11, 13, 15 is oriented exactly at a right angle toward the earth's gravitation field. A reference system 3 which is situated on a calibration frame 1, which is oriented exactly at a right angle toward the earth's gravitation field, may be calibrated very accurately.

In addition to points of support 7, fitting points 20 and/or bore holes 18, which are suitable for accommodating such fitting points 20, are designed on first and second carriers 11, 13. The function of fitting points 20 and bore holes 18 is described with reference to FIGS. 6 through 9.

Figure 2:
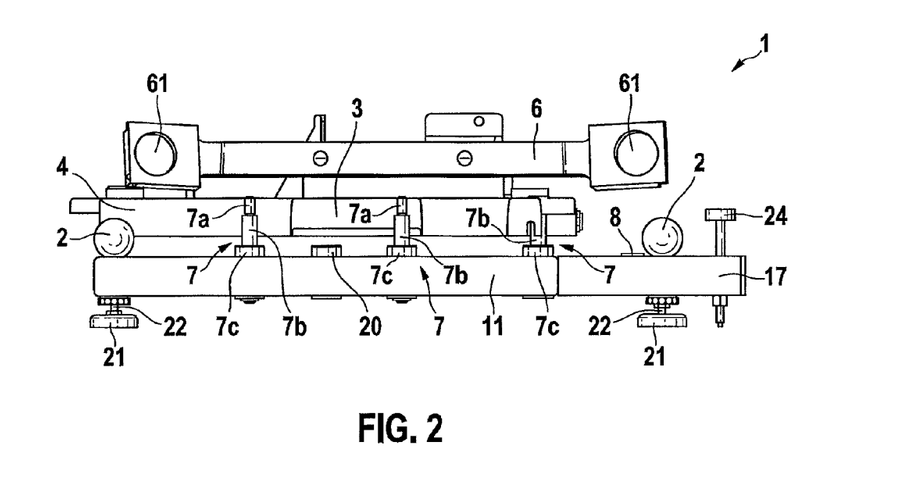
FIG. 2 shows a schematic side view of a calibration frame 1 according to an example embodiment of the present invention having a reference system carrier in the first orientation.

FIG. 2 shows a side view of calibration frame 1 shown in FIG. 1.

Adjustable feet 21 having setting elements 2 and ejector 24 are well recognizable in FIG. 2. Feet 21 are, in particular, supported on beams 11, 17 by shafts 22 provided with a male thread. By rotating setting elements 2, shafts 22 are rotated in the bore holes, which are not recognizable in FIG. 2 and which are implemented in beams 11, 17 and are each provided with a female thread, so that the threads implemented on shafts 22 and in the bore holes bring about a change in the distance between feet 21 and the particular beam 11, 17.

Points of support 7 are designed in the form of a pyramid and are made of three cylinders 7a, 7b, 7c as shown in the exemplary embodiment in FIG. 2, which are situated one on top of the other in the axial direction, each cylinder 7a, 7b having a smaller diameter than the particular cylinder 7b, 7c below it. Upper-most cylinders 7a are designed in such a way that they are insertable, without clearance, into appropriate receptacle openings (not visible in FIG. 2), which are implemented in reference system carrier 4. Reference system carrier 4 including reference system 3 is thus supported clearance-free on calibration frame 1 due to upper-most cylinders 7a of points of support 7 being inserted into the corresponding receptacle openings of reference system carrier 4.

Figure 3:
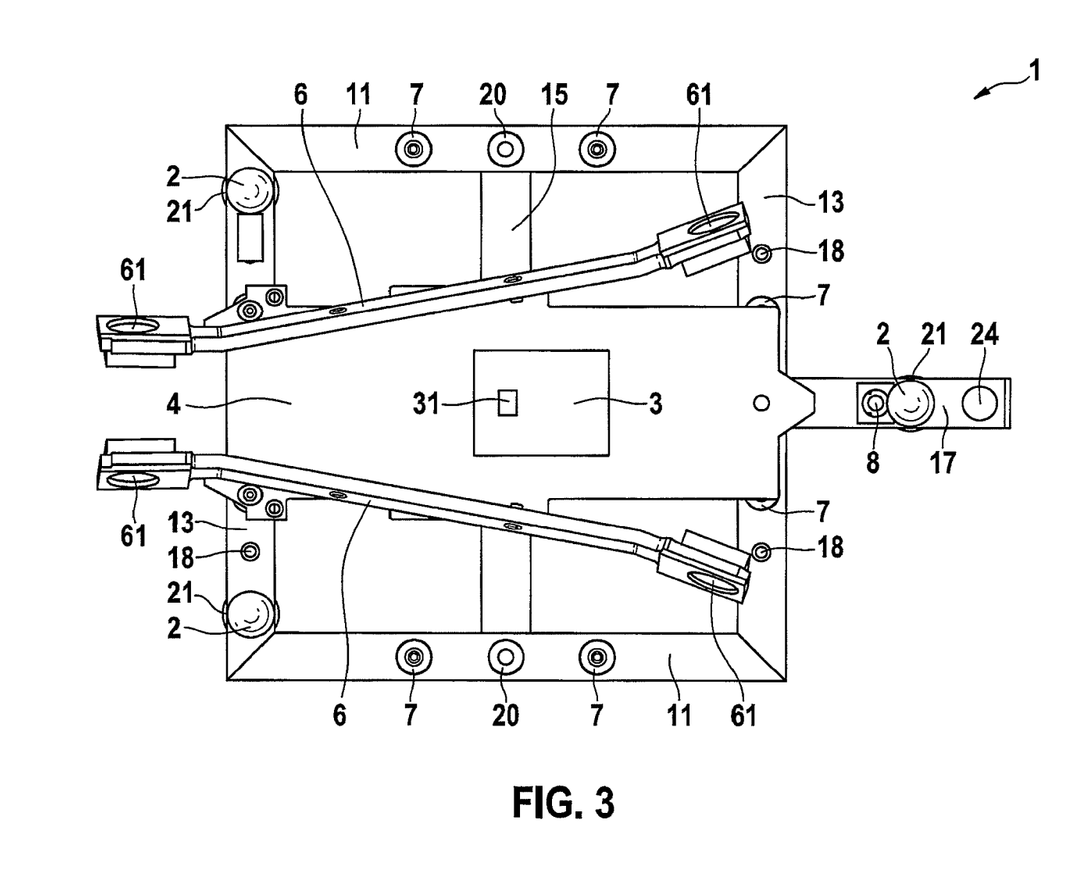
FIG. 3 shows a schematic top view of a calibration frame 1 according to an example embodiment of the present invention having a reference system carrier in a second orientation.

FIG. 3 shows a schematic top view known from FIG. 1 of a calibration frame 1 according to the present invention on which a reference system carrier 4 including a reference system 3 is situated. Compared to FIG. 1, reference system carrier 4 including reference system 3 is rotated in the exemplary embodiment shown in FIG. 3 by 180° about a vertical axis which runs through the central point of the square spanned by first and second beams 11, 13.

To carry out the example method according to the present invention, reference system carrier 4 including reference system 3 is initially situated on calibration frame 1 in the orientation shown in FIG. 1, and the values of reference system 3, in particular of tilt sensor 31, are measured in this orientation.

Subsequently, reference system carrier 4 including reference system 3 is situated on calibration frame 1 in another position, which is different from the position shown in FIG. 1, e.g., in the orientation shown in FIG. 3, and the values of reference system 3 are measured in this orientation of reference system 3. Subsequently, the mean value of the values of reference system 3 measured in the two orientations is formed. In this way, tilt sensor 31 of reference system 3 is calibrated in relation to the earth's gravitation field.

The accuracy of the example method may be improved by additionally situating reference system carrier 4 including reference system 3 in additional different positions on calibration frame 1 and by measuring the values of reference system 3 in these additional positions, and by incorporating them into the mean value formation.

Figure 4:
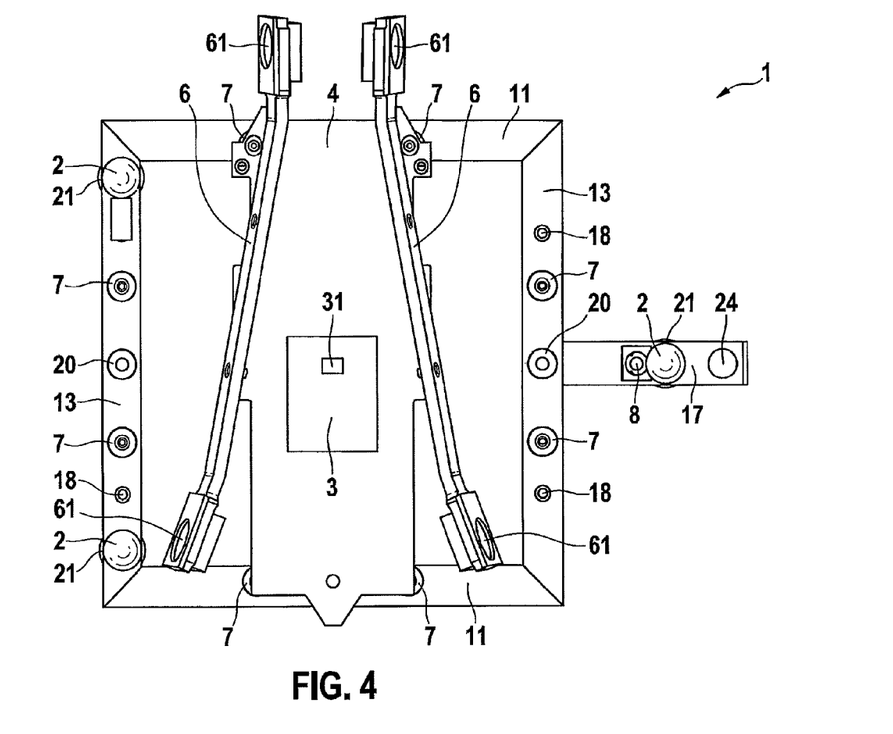
FIG. 4 shows a schematic top view of a calibration frame 1 according to an example embodiment of the present invention having a reference system carrier in a third orientation.

Reference system 3 may, for example, be additionally situated in the position shown in FIG. 4, which is rotated by +90° and −90° compared to the positions shown in FIGS. 1 and 3, respectively. Alternatively or additionally, reference system 3 may be situated in a position rotated by 180° about the vertical axis compared to an illustration shown in FIG. 4.

Figure 5:
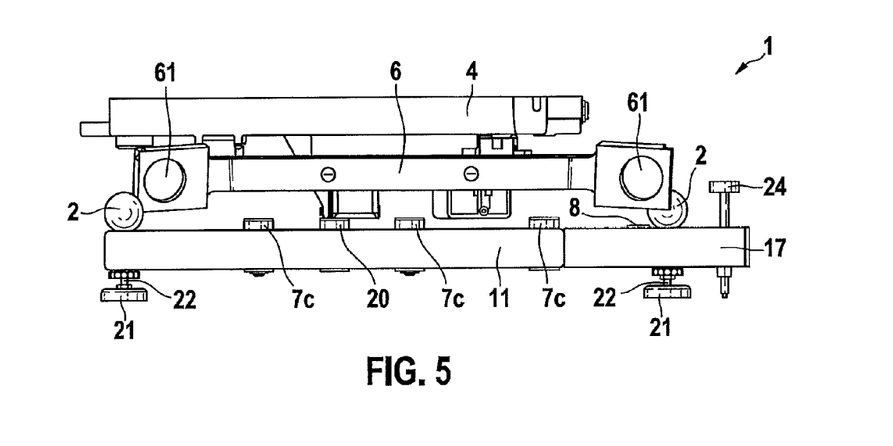
FIG. 5 shows a schematic side view of a calibration frame 1 according to an example embodiment of the present invention having a reference system carrier in a fourth orientation.

In another variant, reference system carrier 4 including reference system 3 and camera carriers 6 is situated on calibration frame 1 rotated by 180° about the longitudinal or transverse axis, i.e., an axis which runs in parallel to the plane of calibration frame 1. Such a position of reference system carrier 4 is shown in FIG. 5, for example.

In one exemplary embodiment, the values of reference system 3, which have been recorded in two positions in-between which reference system carrier 4 has been rotated by 180°, are initially averaged to calibrate reference system 3. In a second step, the mean values are averaged which have been determined in the different possible orientations of reference system 3, as shown in FIGS. 1, 3, 4 and 5.

Figure 6:
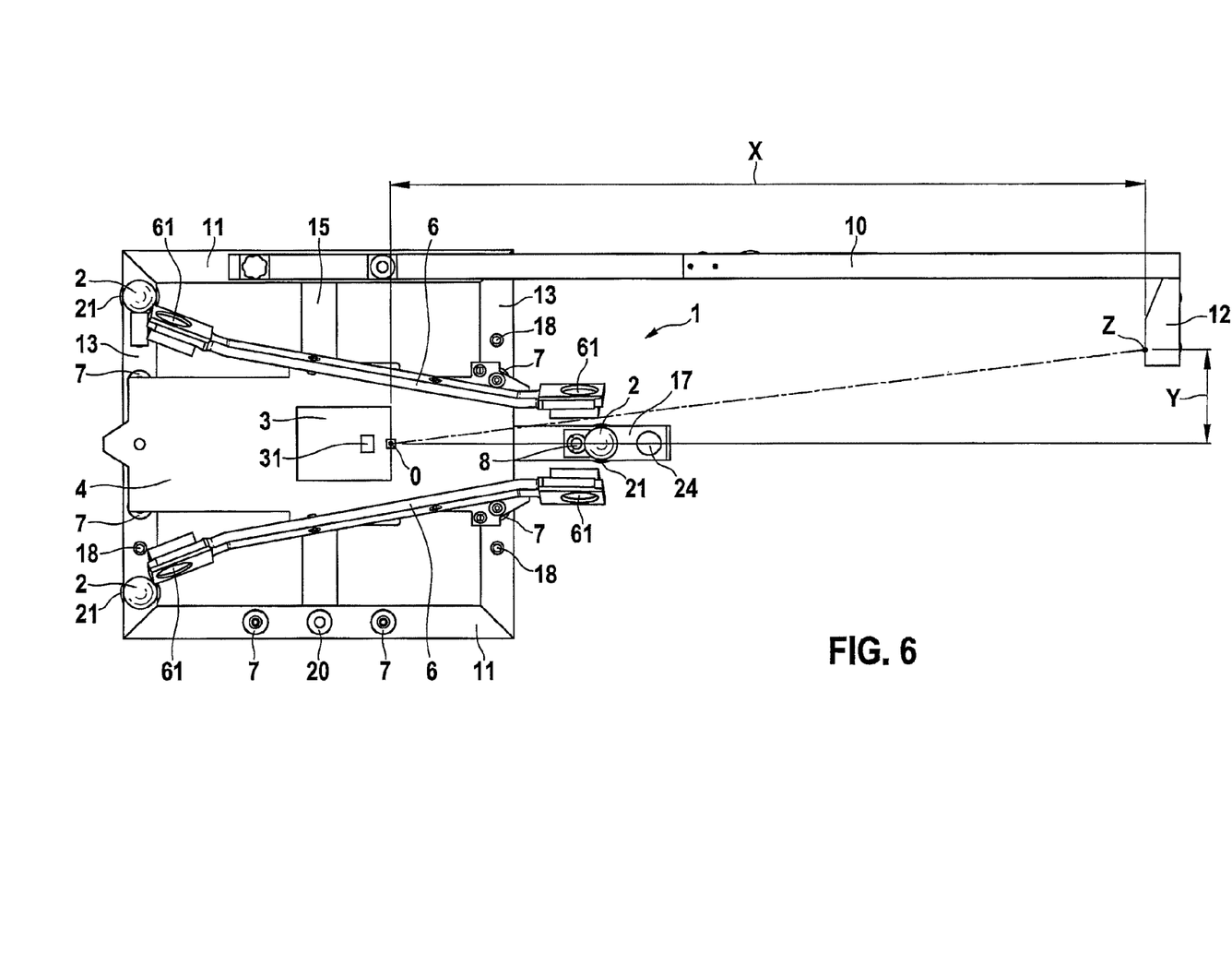
FIG. 6 shows a schematic top view of a calibration frame according to an example embodiment of the present invention having a calibration tool.

To calibrate reference system 3, the distance of reference system 3 to a known position is also to be determined. For this purpose, a calibration tool 12 may be used which is fastened to calibration frame 1 in a known position, as shown in FIG. 6.

Calibration tool 12 is situated in a defined position using a spacer 10, i.e., having a known X distance and a known Y distance to an origin O defined by reference system 3. A target point Z, which is designed as an LED, is affixed on calibration tool 12. Target point Z is detected by a target detection element of reference system 3, which, for example, includes a CCD sensor, to calibrate reference system 3. The accuracy of the calibration is delimited by the accuracy with which target point Z is situated at predefined coordinates X, Y or the accuracy with which these coordinates X, Y are known. In beams 11, 13 of calibration frame 1, bore holes 18 are implemented to be able to securely fasten spacer 10 in a defined position on calibration frame 1.

Figure 7:
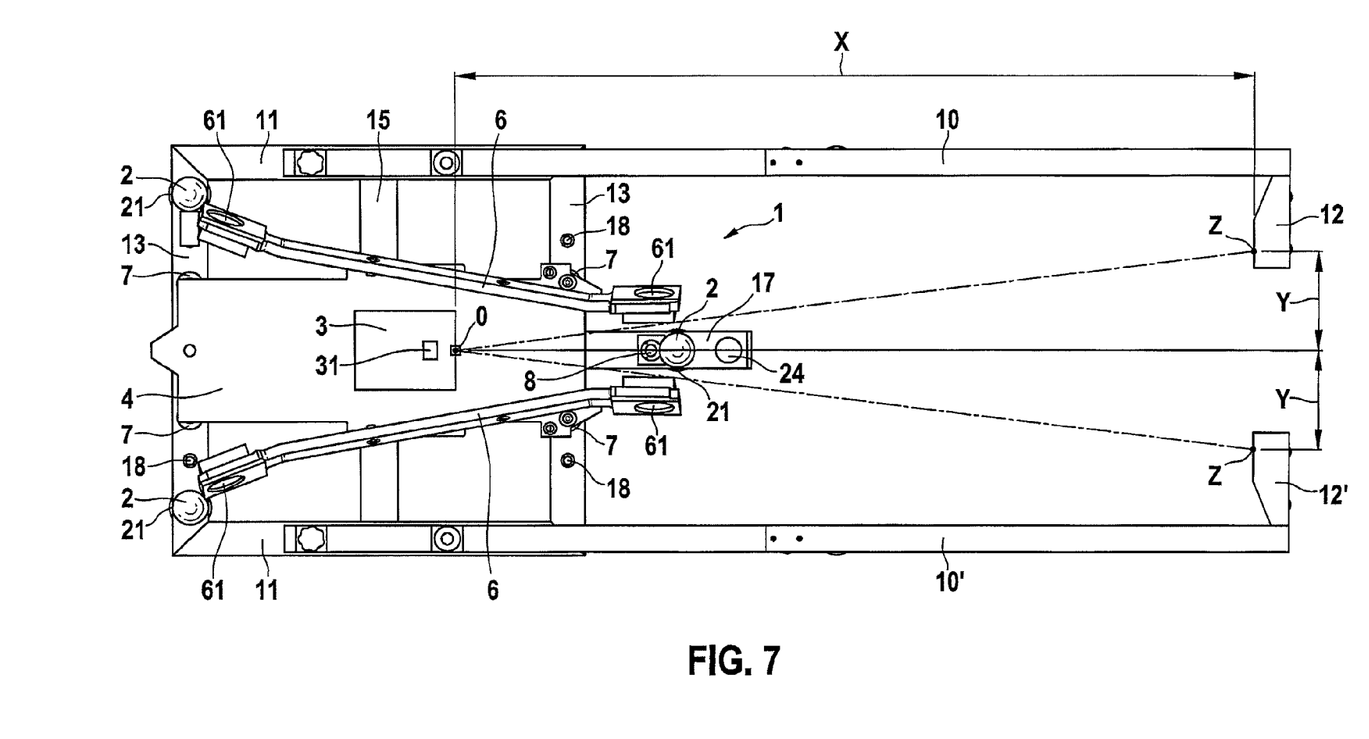
FIG. 7 shows a schematic top view of a calibration frame according to an example embodiment of the present invention having two calibration tools situated symmetrically.
Figure 8:
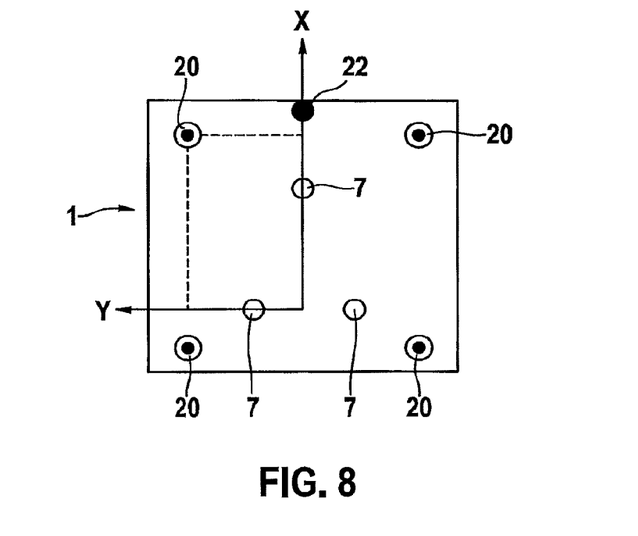
FIG. 8 shows a schematic top view of a calibration frame according to an example embodiment of the present invention having a shaft, points of support and fitting points.
Figure 9:
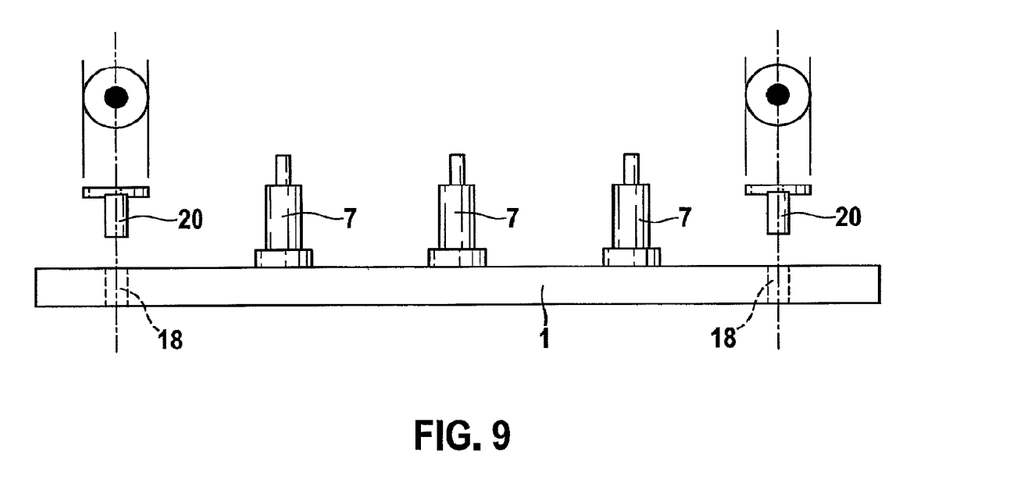
FIG. 9 shows an exemplary embodiment of details of a calibration frame including points of support, bore holes and fitting points.

In one alternative exemplary embodiment shown in FIG. 7, the exact knowledge of coordinates X, Y of the position of target point Z of calibration tool 12 is not required.

Instead, calibration tool 12, 12' is situatable in two exactly symmetric positions in relation to reference system 3. After measuring and storing the two values of target point Z in the two symmetric positions of calibration tool 12, 12', a mean value is formed to calibrate the recording device of reference system 3.

A reference system 3 of a measuring station having a reference system 3 and an image recording system is calibratable by inserting a calibration frame 1 according to the present invention.

Prior to recording an image sequence using the camera of an image recording system, calibration frame 1 is inserted into the calibration device and connected fixedly thereto to prevent calibration frame 1 from unintentionally shifting or rotating during the subsequent measurements.

What is claimed is:

1. A calibration frame for calibrating a reference system of a measuring unit for vehicle measurement, wherein the reference system is to determine horizontal and vertical positions of the measuring unit and a relative position of two measuring units to one another, comprising:
   a plurality of beam elements defining a plane of the calibration frame;
   setting elements which enable a precise spatial orientation of the plane of the calibration frame; and
   a plurality of defined points of support which accommodate a reference system carrier in such a way that the reference system carrier is situatable on the points of support in at least two different orientations, each of the defined points of support configured to project from at least one of the beam elements along an axis substantially perpendicular to the plane of the calibration frame.

2. A calibration frame for calibrating a reference system of a measuring unit for vehicle measurement, wherein the reference system is designed to determine horizontal and vertical positions of the measuring unit and a relative position of two measuring units to one another, the calibration frame comprising:
   a plurality of beam elements defining a plane of the calibration frame;
   setting elements which enable a precise spatial orientation of the plane of the calibration frame;
   a plurality of defined points of support which accommodate a reference system carrier, each of the defined points of support configured to project from at least one of the beam elements along an axis substantially perpendicular to the plane of the calibration frame; and
   a leveling element which indicates the spatial orientation of the calibration frame in relation to the earth's gravitation field.

3. The calibration frame as recited in claim 2, wherein the leveling element is one of a vial or an electronic tilt sensor.

4. The calibration frame as recited in claim 2, further comprising:
   a calibration tool for determining a distance of the reference system to the calibration frame, the calibration tool situatable on the calibration frame in a known position in relation to the calibration frame.

5. The calibration frame as recited in claim 2, further comprising:
   a calibration tool for determining a distance of the reference system to the calibration frame, the calibration tool situatable on the calibration frame in two symmetric positions in relation to the calibration frame.

6. A method for calibrating a reference system of a measuring unit for vehicle measurement, wherein the reference system is to determine horizontal and vertical positions of the measuring unit and a relative position of two measuring units to one another, by using a calibration frame having a leveling element, the method comprising:
   orienting a plane of the calibration frame in relation to the earth's gravitation field using the leveling element;
   situating a reference system carrier including the reference system on a plurality of defined points of support of the calibration frame, each of the defined points of support projecting along an axis substantially perpendicular to the plane of the calibration frame; and
   measuring values of the reference system.

7. The method for calibrating a reference system of a measuring unit for vehicle measurement, wherein the reference system is to determine horizontal and vertical positions of the measuring unit and a relative position of two measuring units to one another, by using a calibration frame, the method comprising:
   situating the reference system carrier including the reference system in a first position on the calibration frame;
   measuring values of the reference system in the first position;
   situating the reference system carrier including the reference system in a second position on the calibration frame, the second position being different from the first position, without changing the position of the calibration frame;
   measuring values of the reference system in the second position; and
   averaging the values of the reference system measured in the first and in the second positions.

8. The method as recited in claim 7, further comprising:
   situating the reference system carrier in at least one additional position on the calibration frame, without changing the position of the calibration frame;
   measuring values of the reference system in the additional position; and
   computing values of the reference system measured in all positions.

9. The method as recited in claim 8, wherein, in a first step, the method includes averaging values which were measured in the positions of the reference system rotated by 180°, and, in a second step, averaging determined mean values.

10. The calibration frame as recited in claim 1, wherein each of the defined points of support includes at least two stackable elements oriented along the axis perpendicular to the plane of the calibration frame, and cross-sectional areas of the at least two stackable elements are different.

11. The calibration frame as recited in claim 10, wherein the at least two stackable elements have a cylindrical cross-sectional area.

12. The calibration frame as recited in claim 10, wherein each of the points of support further includes a third stackable element having a cross-sectional area different than cross-sectional areas of the at least two stackable elements.

13. The calibration frame as recited in claim 12, wherein the reference system carrier rests on the stackable element having the larger cross-sectional area.

14. The calibration frame as recited in claim 12, wherein the stackable element having the smaller cross-sectional area is disposed in a receptacle in the reference system carrier.

15. The calibration frame as recited in claim 1, where the plurality of beam elements include at least two first beams substantially parallel to each other and at least two second beams substantially parallel to each other and substantially perpendicular to the at least two first beams.

16. A system for vehicle measurement, the system comprising:
    the calibration frame as recited in claim 1; and
    a reference system carrier comprising at least one tilt sensor.

17. The calibration frame as recited in claim 2, wherein the leveling element is an electronic tilt sensor.

18. The calibration frame as recited in claim 4, wherein the calibration tool includes a target point.

19. The calibration frame as recited in claim 17, wherein the target point includes an LED.

\* \* \* \* \*